(12) United States Patent
Nossek et al.

(10) Patent No.: US 9,923,752 B2
(45) Date of Patent: Mar. 20, 2018

(54) METHOD FOR DEMODULATION AND DEMODULATOR

(71) Applicant: TECHNISCHE UNIVERSITAET MUENCHEN, Munich (DE)

(72) Inventors: Josef Nossek, Iffeldorf (DE); Manuel Stein, Munich (DE); Sebastian Theiler, Munich (DE)

(73) Assignee: TECHNISCHE UNIVERSITAET MUENCHEN, Munich (DE)

( * ) Notice: Subject to any disclaimer, the term of this patent is extended or adjusted under 35 U.S.C. 154(b) by 0 days.

(21) Appl. No.: 15/361,766

(22) Filed: Nov. 28, 2016

(65) Prior Publication Data

US 2017/0078134 A1     Mar. 16, 2017

Related U.S. Application Data

(63) Continuation of application No. PCT/EP2015/061248, filed on May 21, 2015.

(30) Foreign Application Priority Data

May 28, 2014   (DE) .................. 10 2014 007 716

(51) Int. Cl.
   H04B 1/10       (2006.01)
   H04L 27/38      (2006.01)
   H04B 17/20      (2015.01)
   H04B 1/00       (2006.01)
   H04B 1/06       (2006.01)

(52) U.S. Cl.
   CPC ........... *H04L 27/38* (2013.01); *H04B 1/0017* (2013.01); *H04B 1/06* (2013.01); *H04B 17/20* (2015.01)

(58) Field of Classification Search
   CPC ... H04L 27/38; H04L 27/2649; H04L 27/265; H04B 17/20; H04B 1/0017; H04B 1/06
   USPC ................................ 455/293, 309, 312, 337
   See application file for complete search history.

(56) References Cited

U.S. PATENT DOCUMENTS

| | | | |
|---|---|---|---|
| 6,987,815 B2 * | 1/2006 | Denno | H03D 3/009 375/316 |
| 7,885,360 B2 * | 2/2011 | Tanabe | H04L 27/3863 327/238 |
| 8,670,739 B1 | 3/2014 | Murphy et al. | |
| 2011/0102078 A1 | 5/2011 | Witsching et al. | |
| 2011/0244811 A1 | 10/2011 | Kargl et al. | |
| 2013/0165063 A1 | 6/2013 | Kitsunezuka | |

OTHER PUBLICATIONS

International Preliminary Report on Patentability for PCT Application No. PCT/EP2015/061248 dated Dec. 8, 2016—English translation.

(Continued)

*Primary Examiner* — Sonny Trinh
(74) *Attorney, Agent, or Firm* — Muncy, Geissler, Olds & Lowe, P.C.

(57) ABSTRACT

A method is provided for demodulation of an analog receive signal carrying information, wherein a number of more than two analog signals is formed from the receive signal in separate channels such that the receive signal is multiplied in each case by a period function, the phase thereof respectively differing in the channels, and wherein the multiple signals are each low-pass filtered.

18 Claims, 3 Drawing Sheets

(56) References Cited

OTHER PUBLICATIONS

Kumagai et al., "A New Group Demodulator for Mobile Communication Systems," IEEE Trans. on Vehicular Tech., vol. 49, No. 1, pp. 181-192 (Jan. 1, 2000).
Stein et al., "Quantization-Loss Reduction for Signal Parameter Estimation," 2013 IEEE Int'l Conf. on Acoustics, Speech & Signal Proc., Vancouver, BC, Canada, pp. 5800-5804 (May 26, 2013).
Hao et al., "Superposition Modulation with Reliability-Based Hybrid Detection," IEEE $6^{th}$ Int'l Symp. on Turbo Codes & Iterative Info Proc., pp. 280-284 (Sep. 2010).
Lei et al., "The Demodulation of Non-orthogonal Multiple Modulation Based All Phase," IEEE $4^{th}$ Int'l Conf. on Circuits & Sys. For Comm., pp. 235-239 (May 2008).

* cited by examiner

METHOD FOR DEMODULATION AND DEMODULATOR

This nonprovisional application is a continuation of International Application No. PCT/EP2015/061248, which was filed on May 21, 2015, and which claims priority to German Patent Application No. 10 2014 007 716.0, which was filed in Germany on May 28, 2014, and which are both herein incorporated by reference.

BACKGROUND OF THE INVENTION

Field of the Invention

The invention relates to a method for demodulating an analog receive signal carrying information as well as a corresponding demodulator for carrying out the method. The technical field of the invention is in the area of information transmission in wireless and wired transmission systems. The invention may be used, in particular, in mobile radio systems for communication, in systems for satellite-based position determination (for example, in GPS or Galileo systems) as well as in WLAN networks, in wireless or wired radio, TV or Internet networks as well as for radar and sonar applications and for radiodetermination. In particular, the invention deals with the object of demonstrating, for the receiver side of a transmission path, a way to rapidly and yet energy-efficiently process receive signals which carry a high information density and have a large bandwidth.

Description of the Background Art

In conceptualizing and developing communication and measurement systems, it is desirable to achieve high data rates and a high measuring accuracy. In mobile receiving devices, in particular, a compromise must be reached between technical complexity, price, physical power and energy consumption. Analog-digital conversion (AD conversion) on the receiver side for digital further processing of the information signal, in particular, is a key component with regard to complexity and power efficiency. The analog information signal must be both time-discretized and limited to a finite, digital word width. A digitization method using a high word width results in complex analog circuits, which are limited in speed and also have a high power consumption. This is an obstacle, particularly when using broadband signals (e.g., the ultra-broadband technology, abbreviated as UWB), since fast sampling rates are needed here for the purpose of distortion-free reception.

The method of so-called time interleaved AD conversion (TI-ADC) is one option for sampling receive signals having a high word width without having to compromise on the sampling rate, wherein an existing analog signal is not converted by an individual AD conversion at the desired sampling rate but by a large number of converters, each of which works at a rate which is lower than the desired sampling rate. The receive signal is applied to the inputs of the parallel AD converters for this purpose. These converters sample the signals with a time shift at a reduced sampling rate in each case. The digital signals of the individual converters are then combined by a multiplexer to form the desired digital output signal.

The resulting digital output signal of the TI-ADC ideally corresponds to the signal generated by a conversion using a single converter of the desired high sampling rate. Overall, a sampling rate may thus be achieved, which is higher than the possible sample rates of the individual converters. A TI-ADC method is known, for example, from US 2011/0244811 A1. In this publication, according to the exemplary embodiment illustrated in FIG. 2, a receive signal is distributed to two AD converters, the second converter sampling the receive signal, phase- and thus time-shifted by 90° with respect to the carrier frequency.

In practice, however, multiple AD converters are unable to sample the receive signal, precisely synchronized at an offset from each other. High resolution AD converters are also unable to be implemented with the same design in terms of their real properties. In a TI-ADC method, therefore, synchronization errors as well as different threshold voltages and amplification factors of the individual AD converters must be disadvantageously estimated and compensated for after the digitization adding to the complexity.

SUMMARY OF THE INVENTION

It is therefore an object of the invention to provide a method for demodulating an analog receive signal carrying information as well as a corresponding demodulator, with the aid of which the receive signal is prepared in such a way that AD converters having the lowest possible word width may be used for digitization with the lowest possible loss of information and/or at a preferably high sampling rate.

This object with respect to the method is achieved according to an exemplary embodiment of the invention in that a number of more than two analog signals is formed from the receive signal in separate channels by multiplying the receive signal by a periodic function in each case, the phase thereof respectively differing in the channels, and by low-pass filtering and separately digitizing each of the multiple signals to form filtered analog signals.

In a first step, the invention is based on the idea that, instead of a classic demodulation, wherein two orthogonal channels of the quadrature modulator are sampled according to the QAM method (quadrature amplitude modulation method), in particular for the purpose of reconstructing the output signal, a plurality of analog signals are generated in separate channels on the receiver side, which have a redundancy or are linearly dependent on each other with respect to the information content. To generate these redundant analog signals, the receive signal is multiplied by a periodic function in each case, the phases thereof respectively differing from each other in the channels. To limit the bandwidth of the channels and/or to filter out higher-order multiplication products formed in the signals, the multiple signals are each low-pass filtered in the channels.

In a second step, the invention recognizes that the channels of the receive signal formed in this manner by multiplication have a redundancy with respect to each other, such that a loss of information which occurs by sampling the individual channels by means of simple AD converters having a low word width is, as a whole, at least partially compensated for. In other words, the invention shows a way in which the loss of information resulting by sampling with simple AD converters may be compensated for on the receiver side. For this purpose, the AD converters sample the multiple redundant signals in parallel, so that a much higher sampling rate of the receive signal may be achieved while maintaining the same information gain compared to complex AD converters.

The standard sampling point in time and the simplicity of the individual AD converters also reduce the disadvantages occurring in the prior art with regard to a synchronization of multiple AD converters and with regard to a compensation of different threshold voltages.

The specified method carries out a multiple demodulation on the receiver side as a result of the independent multiplication of different phases by a periodic function, whereby a redundancy is present in the signals obtained. Similarly to the term of oversampling, the term of overdemodulation may therefore be used for the present method.

In principle, it is not ruled out by the invention to directly digitize the redundant signals generated in the separate channels by multiple multiplication. The aforementioned advantages of the option of parallel digitization using simple AD converters may, however, be fully exploited if the multiple signals are advantageously digitized to form digital signals only after they have been low-pass filtered. The bandwidth of the individual signals is limited in each case by the low pass filtering. As a result, the particular sampling rate, which must correspond to at least twice the bandwidth of the sampled signal without loss of information according to the sampling theorem, must be selected to be comparatively low. On the other hand, the low pass filter may be selected or designed with respect to the digitization in such a way that the desired sampling rate for digitizing the individual analog signals corresponds to at least twice the bandwidth of the filter.

The multiple analog signals are each advantageously digitized using a low word width, preferably using a word width of less than 4 bits, in particular using a word with of 1 bit. Converters used for a low-quality digitization of this type are comparatively easily implemented by a small number of comparator circuits. Ultimately, all that is required for a 1-bit converter is a single comparator unit, which compares the input signal with a single comparison value and outputs a binary output value as a function of the comparison performed. In this case, the resolution of the analog-digital conversion is minimized, i.e. reduced to a 1-bit resolution.

The converter circuit for a 1-bit sampling is preferably implemented by a single comparator, which, for example, sets its digital output to 1 for the case that the analog input signal is above a predetermined threshold at a particular time, and otherwise sets it to −1. If the quantization threshold is set to 0 volts, the circuit architecture of the converter may be further simplified, since no regulation for amplifying the receive signal is needed to supply the threshold value. The AD converter then checks the input value only for its sign. In a symmetrical layout, no power matching of the amplifier is necessary at the input.

Due to the low word width of the digital signals, in particular of only 1 bit, resulting by digitizing at low resolution, a large portion of the further processing of the digital signals (e.g., on a chip, on a processor or on an FPGA) may be carried out by means of an efficient 1-bit arithmetic. This may be used to significantly reduce the manufacturing costs of the receiver-side hardware (analog and digital), to minimize the power consumption of receiving devices, and/or to implement very fast chronological sampling rates for receive signals having high bandwidths. As mentioned above, in the present case, the loss of information associated with a digitization using a low word width may be at least partially compensated for by the redundancy of the signals sampled in parallel.

The analog receive signal may carry the information in many different ways. In particular, the information may be constituted by a sequence of individual pulses having a correspondingly high bandwidth. However, an analog receive signal of a given carrier frequency, which carries the information in a modulated manner, is preferred. It may be a linear or non-linear form of modulation. The modulation may be constituted as amplitude modulation, frequency modulation, phase modulation or single sideband modulation.

As mentioned above, the low pass filter is suitably matched to the digitization or the AD converter use or to its possible or required sampling rate. At least the higher frequency multiplication products with respect to the carrier frequency are filtered out by the low pass filtering of the multiple signals.

The periodic function differs from the receive signal and may be characterized by a plurality of repetition frequencies or even have a predefined bandwidth. However, a sine function is preferably used as the periodic function. The carrier frequency of the analog receive signal is advantageously selected here as the frequency of the sine function. The receive signal is not multiplied by itself but by phase-shifted periodic signals that have a repetition frequency.

The redundancy or the linear dependency of the more than two signals provided for further processing is achieved via the phase angle of the periodic function used in each case for multiplying the receive signal in the separate channels. In the case of the QAM method, each receive signal is multiplied by one sine function in two separate channels, the phase equal to 0 being selected in one channel and the phase equal to Π/2 in the other channel. The two separate channels break down into orthogonal channels thereby, so that two linearly independent signals are further processed. In one preferred variant of the overdemodulation method, the phases of the periodic function are selected to be equidistantly apart in the separate channels. For example, the particular phase spacing of the periodic function between the channels is selected in each case as a fraction of Π corresponding to the number of channels.

The specified method is preferably used to estimate one or multiple parameters of the transmission path of the receive signal, i.e., in particular the path between the transmitter and receiver. A parameter of this type is advantageously a phase shift, a runtime, a time shift for synchronization, a Doppler shift or a signal strength. The method may be used accordingly, for example for a radar, sonar, radiodetermination or GPS application. The estimation of a time shift or a runtime for synchronization, a phase shift, a Doppler shift or a signal strength may be used, in particular, to improve the transmission quality and quantity in known mobile radio methods, in particular also in moving systems.

The multiple signals generated from the receive signal may be analyzed for the estimation and evaluated with regard to the transition likelihood occurring along the transmission path, including the reception, in the sense of a channel model. In particular, the type of digitization, i.e., in particular the digitization using a low word width in the present case, may be taken into account. For example, the most likely value of a transmission parameters from the multiple signals actually ascertained may then be specified with the aid of the defined model. In particular, this may take place according to the known, so-called maximum likelihood method. The corresponding estimation algorithm may be implemented on a digital platform, for example a microchip or an FPGA. The estimation algorithm may, however, also be implemented as software. An optimum estimation algorithm is able to achieve the optimum performance, which may be predicted, for example, by the reciprocal value of the measure of information according to Fisher.

In another embodiment, the information carried by the receive signal is estimated or decoded on the basis of the multiple, in particular digitized, signals, to which the above discussion of the estimation of transmission parameters applies accordingly. The maximum possible information rate may be predicted here according to the measure of information according to Shannon.

The object presented at the outset is further achieved according to the invention by a demodulator, which includes an input signal for the receive signal and a demodulation unit designed and configured for carrying out the method described above. The demodulation unit includes a number of more than two output channels, a multiplication device for multiple multiplication of the receive signal and a low pass device for low-pass filtering of the multiple signals generated, the multiple signals each being made available at the output channels.

The advantages mentioned for the demodulation method may be similarly transferred to the demodulator.

The demodulation unit preferable includes an AD converter device. The AD converter device advantageously includes AD converters assigned to the channels, each of which is designed and configured for digitization using a low word width, preferably using a word width of less than 4 bits, in particular using a word width of 1 bit.

An estimation or decoding device, which is connected by information technology to the output channels of the demodulation unit, is advantageously also included, which is configured to estimate or decode one or multiple parameters of the transmission path and/or the information carried by the receive signal from the multiple digitized signals. The estimation or decoding device may be implemented on a digital platform, for example a microchip or an FPGA. However, the estimation or decoding device may also be provided by software or be integrated as part of existing software.

The estimation unit is advantageously designed as a maximum likelihood estimator, which ascertains the transmission parameters and/or the reconstruction of the carried information from the multiple, separately formed output signals of the demodulation unit with greatest overall transition likelihood.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
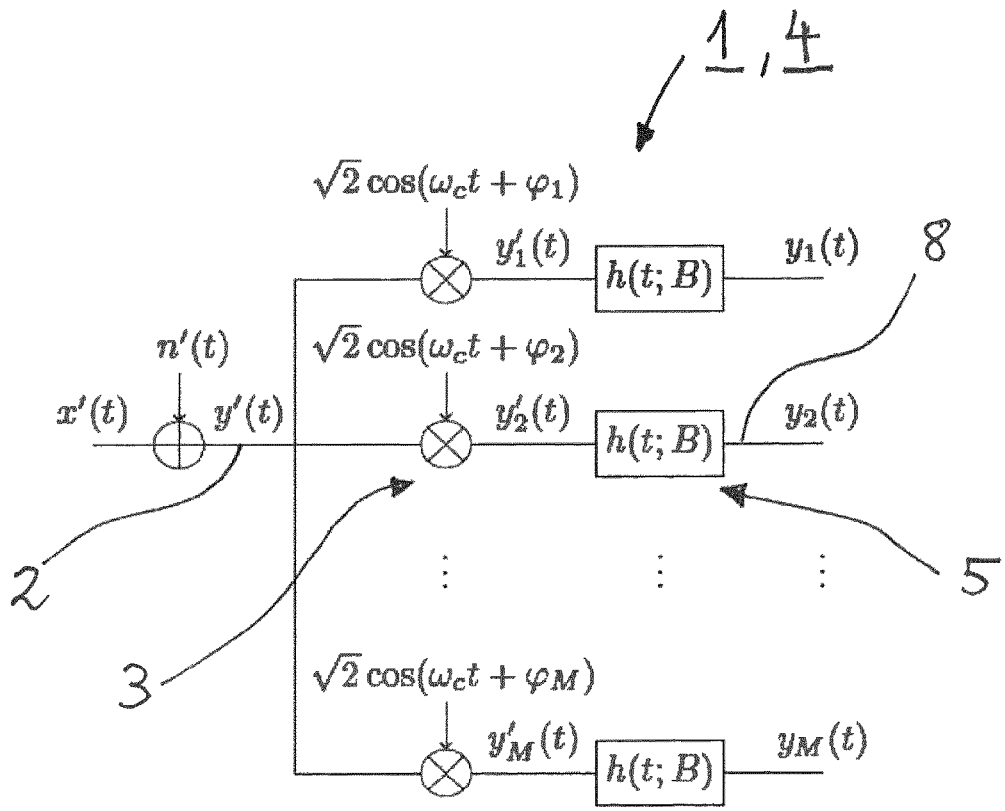
FIG. 1 shows a schematic view of the structure of a demodulator for carrying out an overdemodulation.

The starting point for the following observations is the known QAM method, wherein two independent baseband signals are modulated on a carrier signal by means of multiplicative mixing. To demodulate the carrier signal to the baseband, a quadrature demodulator having two output channels is used on the receiver side. The carrier or receive signal is multiplied by a sinus function oscillating with the carrier frequency in each of the two channels, the phase of the sine function differing by Π/2 in both channels. After the higher frequency multiplication products have been filtered out, the particular baseband signal remains directly in the orthogonal channels. The baseband signal obtained in this manner on the receiver side may be digitized for further processing. Complex AD converters, which sample using the sufficient word width, are needed for a high resolution and a high sampling rate. The achievable sampling rate decreases along with the resolution accuracy of the digitization. Complex AD converters also demonstrate a high energy consumption.

The present invention solves the problem associated with the use of complex AD converters of a reduced sampling rate and a high energy consumption on the receiver side by generating more than two separate channels, the receive signal being multiplied by a periodic function in each channel, in particular a sinus function, the phase of the periodic function respectively differing in the channels. In contrast to the WAM modulation method, more than two linearly dependent signals are generated from the receive signal.

To explain the specified method of overmodulation, a transmit signal of the form $$x'(t) = x'_1(t)\sqrt{2} \cos(\omega_c t) - x'_2(t)\sqrt{2} \sin(\omega_c t) \qquad (1)$$

is assumed as an example, where $\omega_c \in \square$ is the carrier frequency and $x'_{1/2}(t) \in \square$ is two independent input or information signals. The receive signal $$y'(t) = \gamma x'_1(t-\tau)\sqrt{2} \cos(\omega_c t - \varphi) - \gamma x'_2(t-\tau)\sqrt{2} \sin(\omega_c t - \varphi) + \eta'(t) \qquad (2)$$

results on the receiver side, where $\gamma \in \square$ is an attenuation coefficient and $\tau \in \square$ is a time shift due to the signal propagation. $\varphi \in \square$ designates a phase shift in the receive channel. $\eta'(t) \in \square$ would be noise caused by the receiver.

For demodulation to the baseband, the receiver generates, by particular multiplication, m=1, . . . , M channels from the receive signal of the form $$\begin{aligned}\gamma'_m(t) &= y'(t) \cdot \sqrt{2} \cos(\omega_c t + l_m) \qquad (3)\\ &= \gamma x'_1(t-\tau)(\cos(2\omega_c t - \phi + l_m) + \cos(\phi + l_m)) - \\ &\quad - \gamma x'_2(t-\tau)(\sin(2\omega_c t - \phi + l_m) + \sin(\phi + l_m)) + \\ &\quad + \eta'_2(t)\sqrt{2} \cos(\omega_c t + l_m),\end{aligned}$$

with the particular phases $\varphi_m$ of the sine or cosine function used for multiplication. After a low pass filter h(t; B) with a bandwidth B, the particular signal may be written in the mth output channel as $$y_m(t) = \gamma x_1(t-\tau)(\cos(\phi)\cos(l_m) - \sin(\phi)\sin(l_m)) + \qquad (4)$$
$$+ \gamma x_2(t-\tau)(\sin(\phi)\cos(l_m) + \cos(\phi)\sin(l_m)) +$$
$$+ \cos(l_m)\eta_1(t) + \sin(l_m)\eta_2(t),$$

where $$\eta_1(t) = h(t;B) * (\sqrt{2}\cos(\omega_c t)\eta'(t))$$

$$\eta_2(t) = h(t;B) * (\sqrt{2}\sin(\omega_c t)\eta'(t)) \qquad (5)$$

then describes two independent random processes of a spectral power density $\Phi(\omega)$. The notation "*" used here designates the convolution operator. If the different phases in the channels are each described as a vector of the form $$\varphi = [\varphi_1 \varphi_2 \ldots \varphi_M]^T, \qquad (6)$$

the signals in the M separate channels may be indicated as $$y(t) = A(\varphi)(\gamma B(\varphi)x(t-\tau) + \eta(t)), \qquad (7)$$

with the analog signals $$y(t) = [y_1(t)y_2(t) \ldots y_M(t)]^T$$

$$x(t-\tau) = [x_1(t-\tau)x_2(t-\tau)]^T$$

$$\eta(t) = [\eta_1(t)\eta_2(t)]^T \qquad (8)$$

and the matrices $$A(\varphi) = \begin{bmatrix} \cos(\varphi_1) & \sin(\varphi_1) \\ \cos(\varphi_2) & \sin(\varphi_2) \\ \vdots & \vdots \\ \cos(\varphi_M) & \sin(\varphi_M) \end{bmatrix}. \qquad (9)$$

After digitizing each of the M channels at a sampling rate of $f_s = 2B$ for a duration of $T = N/f_s$ and by defining the parameter vector $\theta = \Theta = [\varphi \; \tau]^T$, the digital receive signal N includes temporarily ascertained sampled values $y_n \in \square^m$ of the form $$y_n = \gamma A(\varphi)B(\phi)x_n(\tau) + A(\varphi)\eta_n \qquad (10)$$
$$= \gamma s_n(\theta) + \xi_n$$

with the digital values $$y_n = \left[ y_1\left(\frac{(n-1)}{f_s}\right) \; y_2\left(\frac{(n-1)}{f_s}\right) \; \ldots \; y_M\left(\frac{(n-1)}{f_s}\right) \right]^T \qquad (11)$$

$$x_n(\tau) = \left[ x_1\left(\frac{(n-1)}{f_s} - \tau\right) \; x_2\left(\frac{(n-1)}{f_s} - \tau\right) \right]^T$$

$$\eta_n = \left[ \eta_1\left(\frac{(n-1)}{f_s}\right) \; \eta_2\left(\frac{(n-1)}{f_s}\right) \right]^T$$

and stochastic Gaussian noise $\eta_n, \zeta_n$. It follows from Equation 5 that $$E[\eta_n \eta_n^T] = \frac{1}{2}\begin{bmatrix} 1 & 0 \\ 0 & 1 \end{bmatrix} \qquad (12)$$

and the noise covariance matrix for the sampled value is constituted by the equation $$C = E[\xi_n \xi_n^T] = \frac{1}{2}A(\varphi)A^T(\varphi). \qquad (13)$$

Parameter vector $\Phi$, which in the present case indicates the phase and time shift caused by the signal propagation and signal reception, is unknown on the receiver side.

The model described above is apparent from FIG. 1. In this figure, a demodulator 1 is schematically illustrated by the particular corresponding signals. Demodulator 1 receives a receive signal y'(t) on an input channel 2. M receive signals y'$_m$(t) are generated from receive signal y'(t) in M separate channels with the aid of a multiplication device 3 by multiplying receive signal y'(t) by a cosine function of a different phase in each case. Each of the generated signals y'$_m$(t) is low-pass filtered by a low pass filter device 5 of a corresponding bandwidth B. M low-pass-filtered output signals y$_m$(t) are present in the M output signals of demodulator 1. The design variant illustrated in FIG. 1 corresponds to a demodulator 1 having the smallest possible structural unit, which is designated demodulation unit 4.

The method of overdemodulation illustrated by FIG. 1 results in the known QAM method when two is selected for the number M of channels and $[0 \; \Pi/2]^T$ is selected for the phase vector corresponding to Equation 6. This case results in the matrix $$A(\varphi_c) = \begin{bmatrix} 1 & 0 \\ 0 & 1 \end{bmatrix} \qquad (14)$$

so that, without a phase shift due to propagation, the individual signals may be described as $$y_{1/2}(t) = \gamma x_{1/2}(t-\tau) + \eta_{1/2}(t), \qquad (15)$$

the noise in both channels being non-correlated according to $$C = \frac{1}{2}A(\varphi_c)A^T(\varphi_c) = \frac{1}{2}\begin{bmatrix} 1 & 0 \\ 0 & 1 \end{bmatrix}. \qquad (16)$$

For the present method of overdemodulation, it is to be further assumed by way of example that the AD converter used in each individual M channel for digitizing the signals is a symmetrical 1-bit converter, so that the resulting digitized receive data $r_n \in \{-1,1\}^M$ may be described as $$r = \text{sign}(y_n), \qquad (17)$$

the sign function being defined by $$\text{sign}(z) = \begin{cases} +1 & \text{if } z \geq 0 \\ -1 & \text{if } z < 0 \end{cases}. \qquad (18)$$

Figure 2:
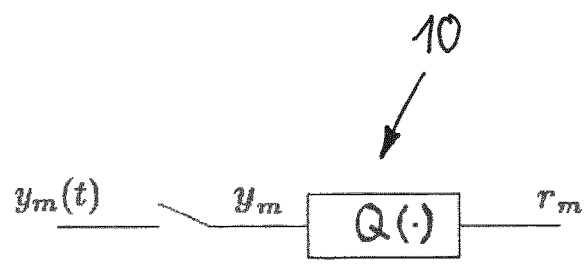
FIG. 2 shows an AD converter implemented as a circuit.

FIG. 2 shows a general AD converter device 10, a corresponding AD converter being arranged for each of channels 8 shown in FIG. 1. In the present case, quantization function Q is given as an example by the above sign function, whereby the 1-bit converter results. A correspondingly modified demodulator 1 thus outputs M digitized signals in the M output channels, the digital data only representing the sign of the sampled signals.

The advantages of the overdemodulation method using a number of M>2 output channels is illustrated below by the measures of information according to Fisher and Shannon. The given channel problem is examined for this purpose, wherein vector θ, i.e. the phase and time shift resulting from the signal propagation and signal reception, is deterministically constituted but unknown as such to the receiver. Parameter θ may be indicated or ascertained, for example, using the maximum likelihood estimator (MLE) according to the maximum likelihood method $$\hat{\theta}(r) = \operatorname*{argmax}_{\theta \in \Theta} \ln p(r; \theta) \tag{19}$$

$$= \operatorname*{argmax}_{\theta \in \Theta} \sum_{n=1}^{N} \ln p(r_n; \theta),$$

the digitized receive signal with N sampled values having the following form $$r = [r_1^T r_2^T \ldots r_N^T]^T. \tag{20}$$

For a sufficiently large number N of sampled values, matrix $R_\theta$ of the mean squared error deviation may be analytically indicated according to the Cramer-Rao inequality as the inverse Fischer Information Matrix (FIM)

$$\overline{R}_{\hat{\theta}} = \lim_{N \to \infty} E\left[(\hat{\theta}(r) - \theta)(\hat{\theta}(r) - \theta)^T\right] \tag{21}$$

$$= F^{-1}(\theta)$$

The FIM is defined by $$F(\theta) = \int_R p(r; \theta)\left(\frac{\partial \ln p(r; \theta)}{\partial \theta}\right)^2 dr, \tag{22}$$

R being the mathematical carrier of digitized receive vector r, For temporary sampled values $r_n$, the FIM may be additively written as $$F(\theta) = \sum_{n=1}^{N} F_n(\theta), \tag{23}$$

the sampled value-specific FIM being constituted as $$F_n(\theta) = \int_{R_n} p(r_n; \theta)\left(\frac{\partial \ln p(r_n; \theta)}{\partial \theta}\right)^2 dr_n. \tag{24}$$

For a pessimistic measure of information according to Fisher, an approximation of $\overline{F}_n(\theta)$ FIM may be assumed in the form $$F_n(\theta) \geq \overline{F}_n(\theta). \tag{25}$$

With the moments $$\mu_n(\theta) = \int_{R_n} r_n p(r_n; \theta) dr_n$$

$$R_n(\theta) = \int_{R_n} (r_n - \mu_n(\theta))(r_n - \mu_n(\theta))^T p(r_n; \theta) dr_n, \tag{26}$$

the pessimistic FIM results as $$\overline{F}_n(\theta) = \left(\frac{\partial \mu_n(\theta)}{\partial \theta}\right)^T R_n^{-1}(\theta)\left(\frac{\partial \mu_n(\theta)}{\partial \theta}\right). \tag{27}$$

The first moment may be calculated element by element via $$[\mu_n(\theta)]_m = p([r_n]_m = 1; \theta) - p([r_n]_m = -1; \theta) \tag{28}$$

$$= \operatorname{erf}\left(\gamma \frac{[s_n(\theta)]_m}{\sqrt{2} [C]_{mm}}\right),$$

where erf (z) is the error function. The following furthermore results for the second moment $$[R_n(\theta)]_{mm} = 1 - [\mu_n(\theta)]_m^2, \tag{29}$$

with the off-diagonal entries $$[R_n(\theta)]_{mk} = 4\varphi_{mk}(\theta) - (1 - [\mu_n(\theta)]_m)(1 - [\mu_n(\theta)]_k), \tag{30}$$

where $\varphi_{mk}(\theta)$ is the cumulative density function (CDF) of the bivariate Gaussian distribution $$p([\xi_n]_m, [\xi_n]_k) = N\left(\begin{bmatrix} 0 \\ 0 \end{bmatrix}, \begin{bmatrix} [C]_{mm} & [C]_{mk} \\ [C]_{km} & [C]_{kk} \end{bmatrix}\right) \tag{31}$$

with the upper bounds of integration $$[-\gamma[s_n(\theta)]_m - \gamma[s_n(\theta)]_k]^T.$$

The derivation of the first moment may be indicated element by element via $$\left[\frac{\partial \mu_n(\theta)}{\partial \theta}\right]_m = \frac{2\gamma}{\sqrt{2\pi[C]_{mm}}}\left[\frac{\partial s_n(\theta)}{\partial \theta}\right]_m e^{-\left(\gamma \frac{[s_n(\theta)]_m}{\sqrt{2[C]_{mm}}}\right)^2}, \tag{32}$$

where $$\frac{\partial s_n(\theta)}{\partial \theta} = \left[\frac{\partial s_n(\theta)}{\partial \phi} \quad \frac{\partial s_n(\theta)}{\partial \tau}\right] \tag{33}$$

$$= \left[A(\varphi)\frac{\partial B(\phi)}{\partial \phi}x_n(\tau) \quad A(\varphi)B(\phi)\frac{\partial x_n(\tau)}{\partial \tau}\right],$$

and where $$\frac{\partial B(\phi)}{\partial \phi} = \begin{bmatrix} -\sin(\phi) & \cos(\phi) \\ -\cos(\phi) & -\sin(\phi) \end{bmatrix} \tag{34}$$

$$\frac{\partial x_n(\tau)}{\partial \tau} = -\left[\frac{dx_1(t)}{dt} \quad \frac{dx_2(t)}{dt}\right]^T \bigg|_{t=\left(\frac{(n-1)}{f_s} - \tau\right)},$$

For performance statements of the overdemodulation method according to the pessimistic measure of information according to Fisher, a transmit signal of the following form is furthermore examined by way of example $$x_{1/2}(t) = \sum_{k=-\infty}^{\infty} [b_{1/2}]_{mod(k,K)} g(t-kT_b), \quad (35)$$

where $b_{1/2} \in \{-1,1\}^K$ binary vectors with K=1023 are symbols of a particular duration $T_b$=977.52 ns and g(t) is a rectangular pulse having a bandwidth of B=1023 MHz. The sampling rate would be $f_s$=2B to obtain a corresponding temporary sampling rate. If the signal is sampled for a period T=1 ms, N=2046 sampled values are obtained on the receiver side. The unknown vector is assumed as $$\theta = \left[\frac{\pi}{8} \; 0\right]^{T'},$$

the phase differences in the channels are situated equidistantly apart with $[\varphi]_m = (m-1)*\Pi/M$ and the performance of the method would be assumed to be M=2 and an unlimited AD resolution with regard to an ideal reference system. With regard to an ideal M=2 (QAM) system, the ratio of the mean squared error deviation of the overdemodulation method in decibels is then constituted by $$X_{\phi/\tau}(\theta) = 10\log\left(\frac{[F^{-1}(\theta)]_{11/22}}{[F_{ref}^{-1}(\theta)]_{11/22}}\right), \quad (36)$$

where the FIM of the reference system is constituted by $$F_{ref}(\theta) = \gamma^2 \sum_{n=1}^{N} \left(\frac{\partial s_n(\theta)}{\partial \theta}\right)^T C^{-1}\left(\frac{\partial s_n(\theta)}{\partial \theta}\right). \quad (37)$$

In the case of M=2, the noise is independent in both demodulation channels. Under this condition, Equation 36 results in the exact information or performance loss due to a 1-bit conversion.

Figure 3:
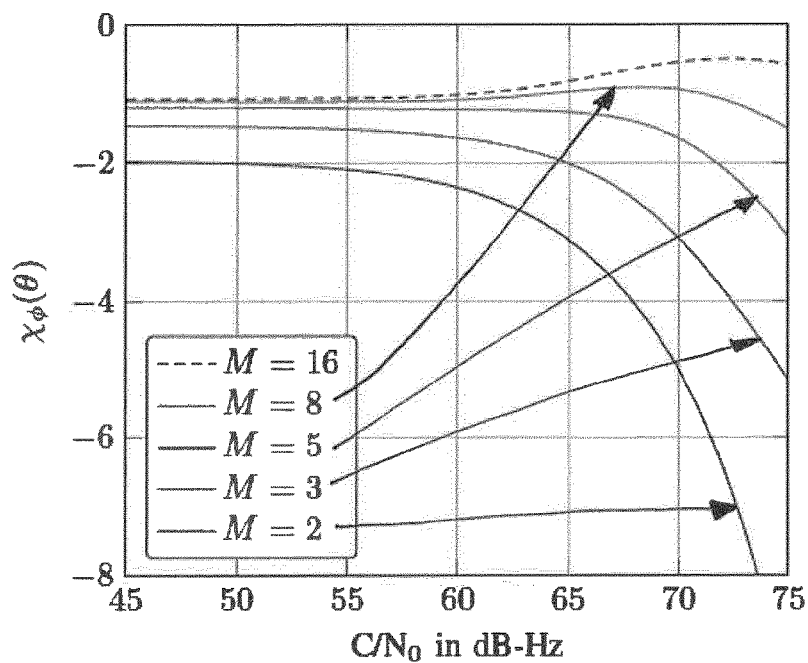
FIG. 3 shows the performance of the overdemodulation method as a comparison of the average squared error width and an ideal QAM method as a function of the signal-to-noise ratio and the number of separate channels with respect to the ascertainment of the phase difference of the transmission path.
Figure 4:
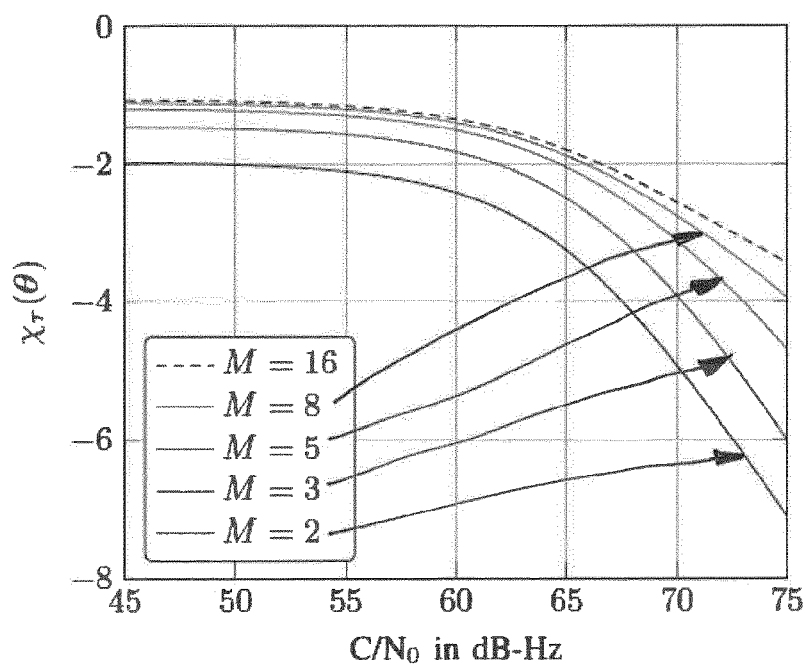
FIG. 4 shows the ratio of the mean squared error width with respect to the ascertainment of the runtime on the transmission path in a representation according to FIG. 3.

In FIGS. 3 and 4, the particular result is illustrated against an assumed carrier-to-noise ratio (C/N$_0$), where C indicates the signal power of modulated signal x'(t) (see Equation 1) in watts prior to receipt, and N$_0$ indicates a noise power density in watts per hertz.

The result with regard to the ascertainment of phase shift Φ is represented in FIG. 3 and with regard to time shift τ in FIG. 4 by the signal propagation and signal receipt. In both figures, the result is also plotted for a different number M of channels.

For both parameters, it is apparent that the quantization loss may be reduced by the employed 1-bit converter from −1.96 dB to −1.07 dB for M=16, due to the specified overdemodulation method within a range of a low signal-to-noise ratio. In the case of 75 dB Hz, the loss may even be reduced from −9.69 dB to −0.57 dB for the parameter of phase shift Φ. For the parameter of time shift τ, the loss here may be reduced from −7.12 dB to −3.44 dB. With a high signal-to-noise ratio, in particular, the overdemodulation method therefore delivers a much better performance than the known QAM method with regard to an estimate of transmission parameters.

In information theory, the indicated overdemodulation method may be interpreted as a so-called MIMO method (multiple input, multiple output), two inputs and M outputs being present with regard to the example examined. As a result, the output may be described as equation $$y = Hx + \xi, \quad (38)$$

an AD converter of the form r=sign (y) being connected downstream.

For a system of this type, the measure of information according to Shannon I (x; r), which permits a statement to be made about the maximum possible transmission rate, may be estimated by $$I(x;r) \geq \frac{1}{2}\log_2 \det\left(1_M + R_{\xi'\xi'}^{-1} H' R_{xx} H'^T\right), \quad (39)$$

where $R_{xx}$ is the second moment of input signal x, and $$R_{\xi'\xi'} = \frac{2}{\pi}\left(\arcsin\left(\mathrm{diag}(R_{yy})^{-\frac{1}{2}} R_{yy} \mathrm{diag}(R_{yy})^{-\frac{1}{2}}\right)\right) - \quad (40)$$
$$\frac{2}{\pi}\left(\mathrm{diag}(R_{yy})^{-\frac{1}{2}} R_{yy} \mathrm{diag}(R_{yy})^{-\frac{1}{2}} +\right.$$
$$\frac{2}{\pi}\left(\mathrm{diag}(R_{yy})^{-\frac{1}{2}} R_{\xi\xi} \mathrm{diag}(R_{yy})^{-\frac{1}{2}}\right)$$

$$H' = \sqrt{\frac{2}{\pi}} \, \mathrm{diag}(R_{yy})^{-\frac{1}{2}} R_{yy}.$$

applies.

Assuming random input signals, which are independent from each other, and the covariance matrix $$R_{xx} = \frac{1}{2}\begin{bmatrix} 1 & 0 \\ 0 & 1 \end{bmatrix}. \quad (41)$$

Figure 5:
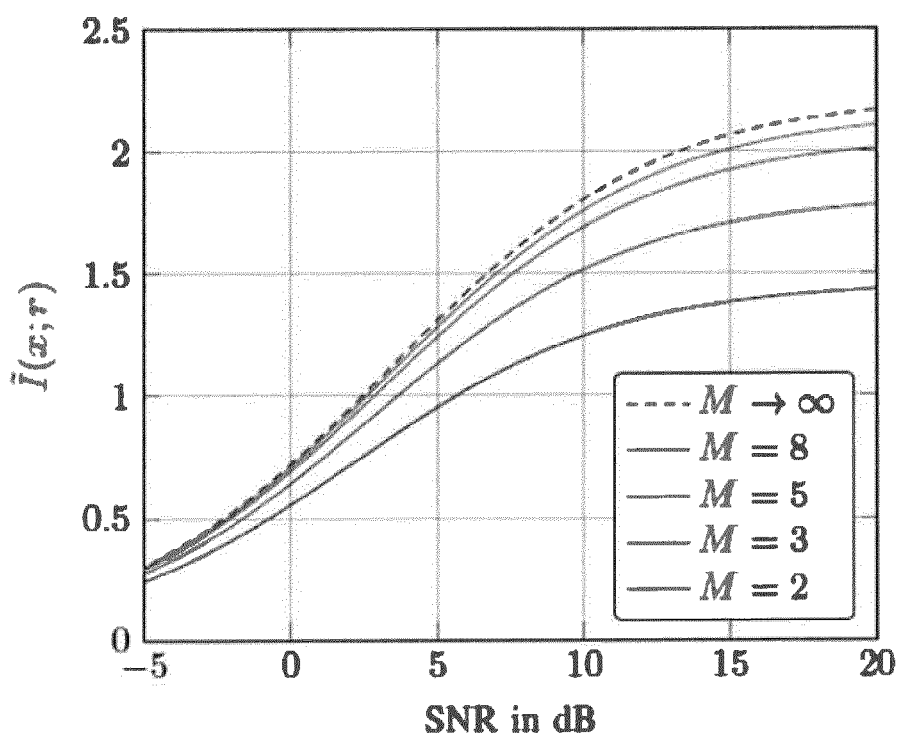
FIG. 5 shows the maximum transmission rate achievable in each case by the overdemodulation according to Shannon as a function of the signal-to-noise ratio and for the number of separate channels.

FIG. 5 shows the transmission rate achievable with the aid of the overdemodulation method, plotted against the signal-to-noise ration (SNR) for a different number M of demodulation channels, 1-B AD converters being used in each case. It is apparent that, with the aid of the overdemodulation method, the transmission rate for M with respect to ω may be increased approximately 23% over the QAM method according to the prior art in the low SNR regime. For high signal-to-noise ratios, approximately 51% more data may be transmitted with the aid of the specified method than is possible with the aid of a known QAM method.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for demodulating an analog receive signal carrying information, the method comprising:
   generating more than two separate channels;
   forming more than two analog signals from the analog receive signal by multiplying the analog receive signal by a periodic function in each of the more than two separate channels, a phase of the periodic function respectively differing in each of the more than two separate channels; and low pass filtering and separately digitizing each of the more than two analog signals to form filtered analog signals.

2. The method according to claim 1, wherein the periodic function differs from the analog receive signal and is selected as a sine function.

3. The method according to claim 1, wherein the filtered analog signals are each digitized to form digital signals.

4. The method according to claim 3, wherein the filtered analog signals are each digitized using a word width of less than 4 bits or a word with of 1 bit.

5. The method according to claim 3, wherein a bandwidth of the low pass filtering of the more than two analog signals and a sampling rate of the digitization are selected such that the sampling rate corresponds to at least twice the bandwidth.

6. The method according to claim 1, wherein the analog receive signal is of a given carrier frequency, which carries the information in a modulated manner.

7. The method according to claim 6, wherein the filtered analog signals are each low-pass-filtered by separating higher frequency products with respect to the carrier frequency.

8. The method according to claim 6, wherein the periodic function of the carrier frequency is selected as a repetition frequency.

9. The method according to claim 1, wherein phases of the periodic function are each selected equidistantly apart in the separate channels.

10. The method according to claim 1, wherein at least one parameter of a transmission path is estimated based on the filtered analog signals.

11. The method according to claim 10, wherein a phase shift, a runtime, a time shift, a Doppler shift or a signal strength is estimated as the parameter.

12. The method according to claim 1, wherein the information carried by the analog receive signal is estimated or decoded based on the filtered analog signals.

13. The method according to claim 10, wherein a maximum likelihood method is used for the estimation.

14. A demodulator for demodulating an analog receive signal carrying information, the demodulator comprising:
an input channel for the analog receive signal;
a demodulation unit configured to carry out the method according to claim 1;
at least two output channels;
a multiplication device; and
a low pass filter device, wherein the multiple signals are each made available at the input channels.

15. The demodulator according to claim 14, wherein the demodulation unit includes an AD converter.

16. The demodulator according to claim 15, wherein the AD converter includes AD converters assigned to the channels, each of which configured for digitization with a word width of less than 4 bits or a word width of 1 bit.

17. The demodulator according to claim 14, wherein an estimation or decoding device, which is connected by information technology to the output channels of the demodulation unit, is also included, which is configured to estimate or decode at least one parameter of a transmission path and/or the information carried by the receive signal from the multiple digitized signals.

18. The demodulator according to claim 17, wherein the estimation or decoding unit is a maximum likelihood estimator.

* * * * *